United States Patent
Jonas et al.

(10) Patent No.: US 10,293,492 B1
(45) Date of Patent: May 21, 2019

(54) FINGER ASSEMBLY HAVING A TALON AND SPIN PADDLE ACTUATION

(71) Applicant: Amazon Technologies, Inc., Seattle, WA (US)

(72) Inventors: Jude Royston Jonas, Hudson, NH (US); Ennio Claretti, Somerville, MA (US); Justin Thomas Juranovits, Salem, NH (US); Andrew D. Marchese, Concord, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/799,774

(22) Filed: Oct. 31, 2017

(51) Int. Cl.
B25J 9/16 (2006.01)
B25J 15/02 (2006.01)
B25J 15/06 (2006.01)

(52) U.S. Cl.
CPC ........... *B25J 15/028* (2013.01); *B25J 9/1694* (2013.01); *B25J 15/0616* (2013.01)

(58) Field of Classification Search
CPC ...... G01N 35/0099; B25B 9/00; B25J 15/028; B25J 15/0616; B25J 9/1694
See application file for complete search history.

(56) References Cited

U.S. PATENT DOCUMENTS

| | | | | |
|---|---|---|---|---|
| 2,743,954 | A * | 5/1956 | Ostlund | B66C 1/422 294/106 |
| 4,286,380 | A * | 9/1981 | Blount | B25J 15/10 29/593 |
| 5,338,150 | A * | 8/1994 | Focke | B65G 47/90 294/115 |
| 6,412,844 | B1 * | 7/2002 | Hendzel | B25J 15/08 294/113 |
| 8,602,470 | B2 * | 12/2013 | Bieler | B25J 15/026 294/119.1 |
| 9,401,300 | B1 * | 7/2016 | Choy | H01L 21/68707 |
| 2013/0088031 | A1 * | 4/2013 | Jones | G01N 35/0099 294/203 |

* cited by examiner

*Primary Examiner* — Stephen A Vu
(74) *Attorney, Agent, or Firm* — Baker & Hostetler LLP

(57) ABSTRACT

Finger assemblies at the end of a robotic arm end effector includes talon that are retractable. Retraction may be accomplished by a vertical or horizontal barrel cam, a paddle and spin assembly, and/or a resilient plate.

13 Claims, 14 Drawing Sheets

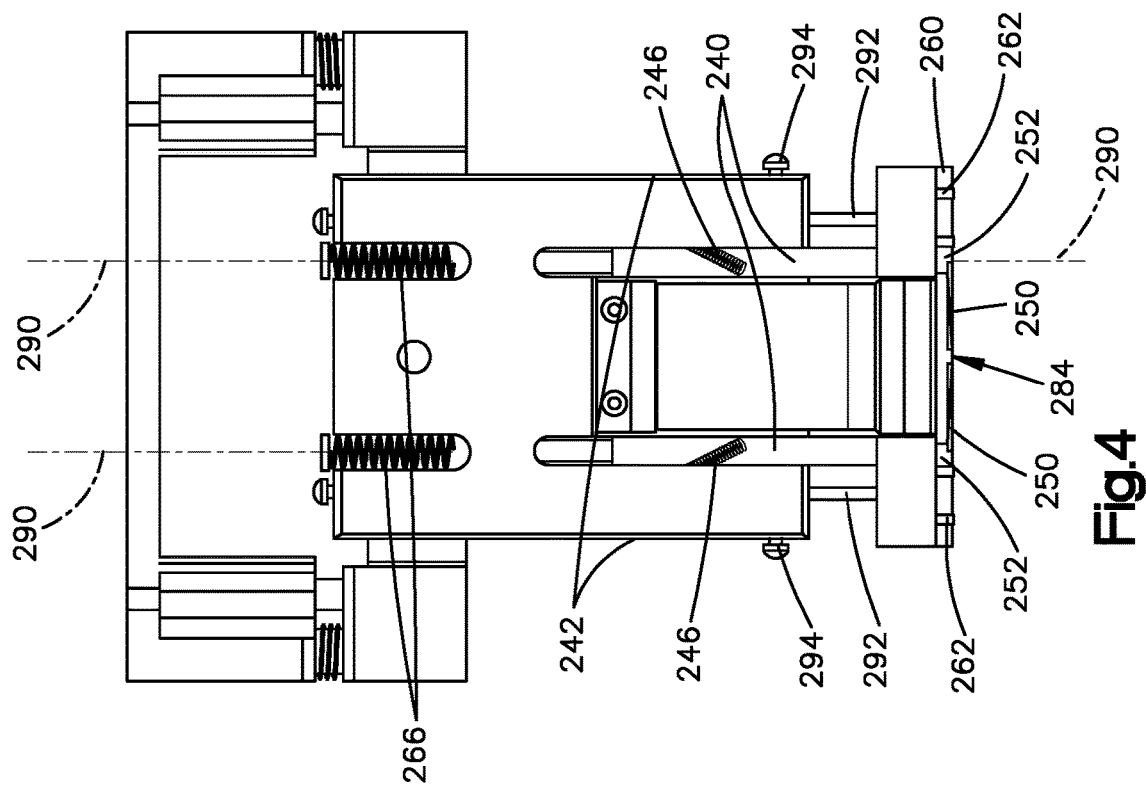
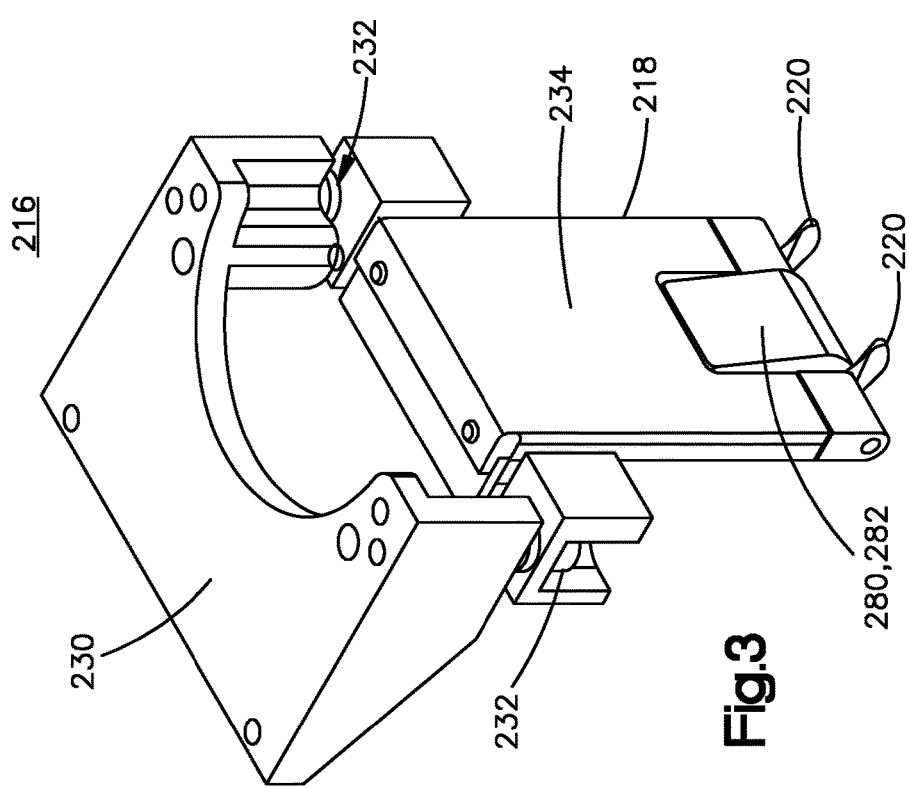

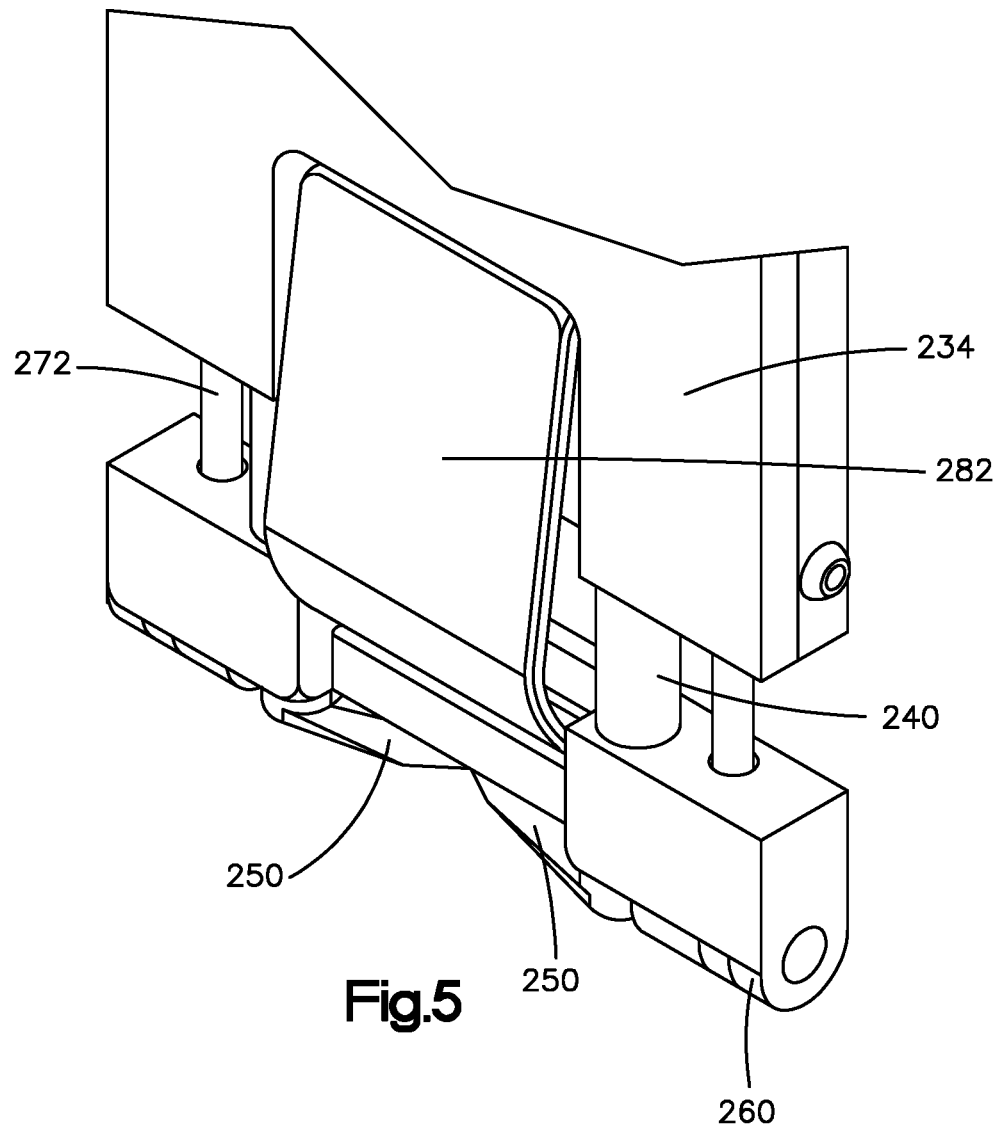

FINGER ASSEMBLY HAVING A TALON AND SPIN PADDLE ACTUATION

BACKGROUND

The present invention is related to robotic item manipulation, and more particularly to the structure and function of finger configurations for manipulating items.

Many industries rely on robotic manipulators, such as robotic arms. Such robotic manipulators function to increase repeatability of tasks, increase efficiency of production lines, and bring other benefits to their operators. A robotic arm may include an end effector that is specialized to grasp a particular class of objects from known or fixed orientations. End effectors may include grippers that have friction surfaces to contact opposing sides of an object.

When manipulating the object, the robot positions the arm in close proximity to the object and the arm deploys the finger. The finger typically then comes in contact with the object and applies a horizontal, normal force to squeeze the object. A high friction material on the body of the finger enhances gripping.

BRIEF DESCRIPTION OF THE FIGURES

FIG. 3 is a perspective view of a first embodiment finger assembly with the talons in their extended position;

FIG. 4 is a side view of the finger assembly of FIG. 3 showing the talons in their retracted position;

FIG. 5 is an enlarged view of a portion of the finger assembly of FIG. 3;

DESCRIPTION OF PREFERRED EMBODIMENTS

A robotic manipulator such as a robotic arm has a pair of end effectors. Each end effector can include at least one finger assembly for use at the distal end of the robotic arm. In the embodiments shown, two end effectors and fingers are shown to illustrate that the robotic arm can apply a horizontal force on the object to be lifted. The present invention is not limited to employing any number of end effectors or finger assemblies, as the particular number and configuration of finger assemblies may be chosen according the desired parameters of the application. A pair of opposing end effectors and finger assemblies is typical, and other configurations, such as one, four, or any other number of end effectors and finger assemblies are possible.

Each finger assembly includes an end effector mount adapted for mounting to the end effector of the robotic arm. Referring to the end effector mount is not intended to limit the scope of the finger assemblies to any particular use, but rather is intended merely to recite structure to which parts of the finger assembly may be coupled. Thus, a finger body is coupled to and preferably is attached to and extends downwardly from the end effector mount.

The finger body typically has an anti-slip or high friction face to aid in the gripping of objects 108 when lifting as generally described herein. The finger assembly also includes a retractable talon coupled at a lowermost point of the finger body. The talon has an extended position in which the talon extends outwardly from the contact face of the finger body and a retracted position in which that talon is recessed relative to the contact face of the finger body. The talon in the extended position is adapted to at least partially support a load from an item lifted by the robotic arm.

The talons disclosed herein can have any structure and be formed of any material suitable for bearing the load required in the particular application. For non-limiting example, the talons can be formed of flat or sheet metal (such as sheet steel), can be formed of folded sheet metal to include thin structural gussets, can be formed of a structural plastic sheet, and/or any other configuration suitable for the dimensions and loads chosen for the particular application.

Figure 1:
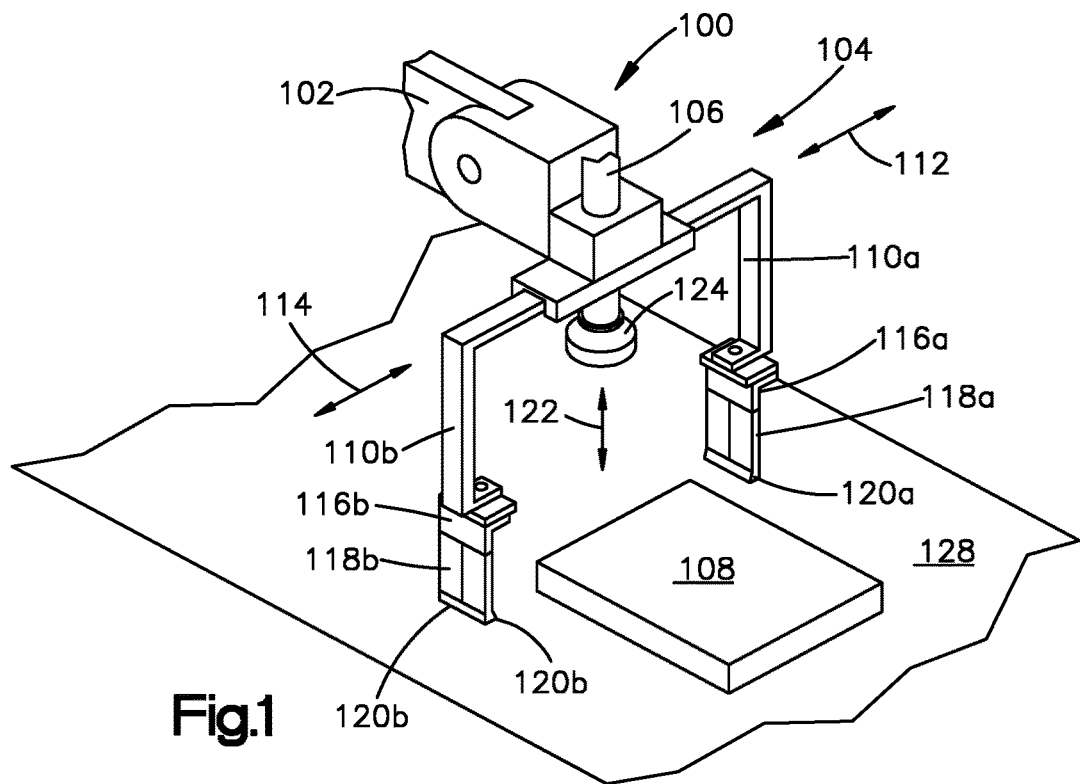
FIG. 1 is a schematic view of a robotic arm assembly in a ready position in which finger assemblies are spaced apart from the object to be lifted.
Figure 2:
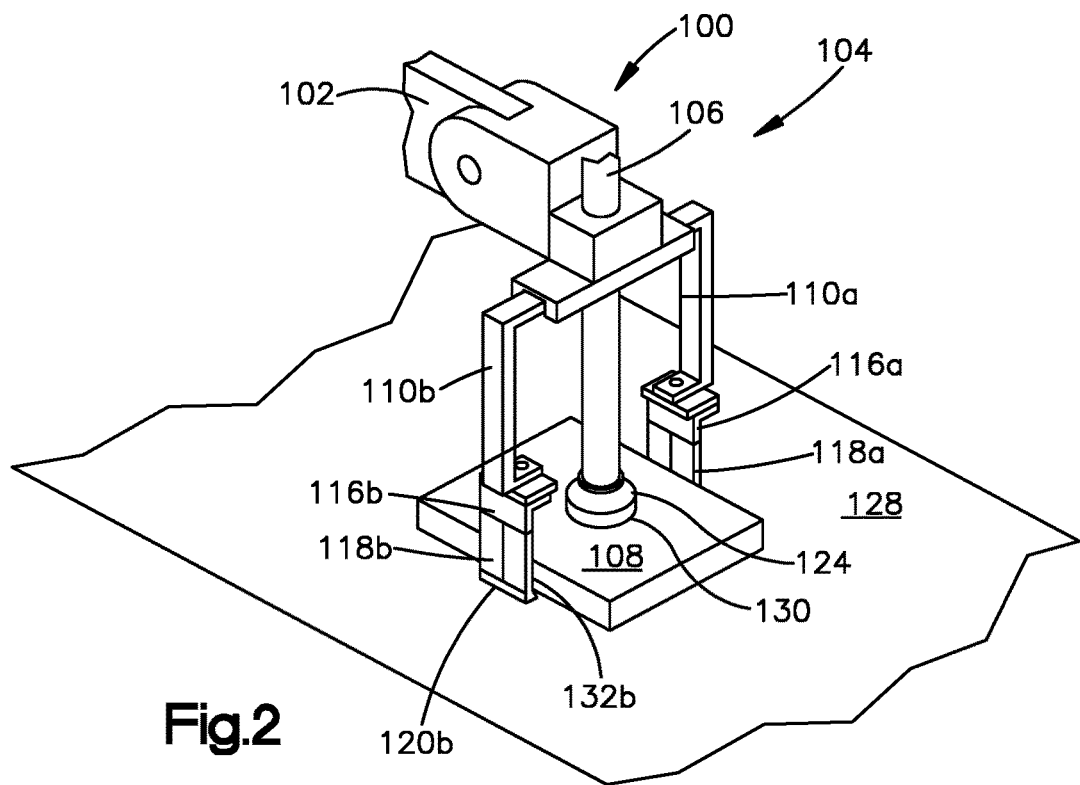
FIG. 2 is a schematic view of the robotic arm of FIG. 1 with the finger assemblies engaged with the object.
Figure 6B:
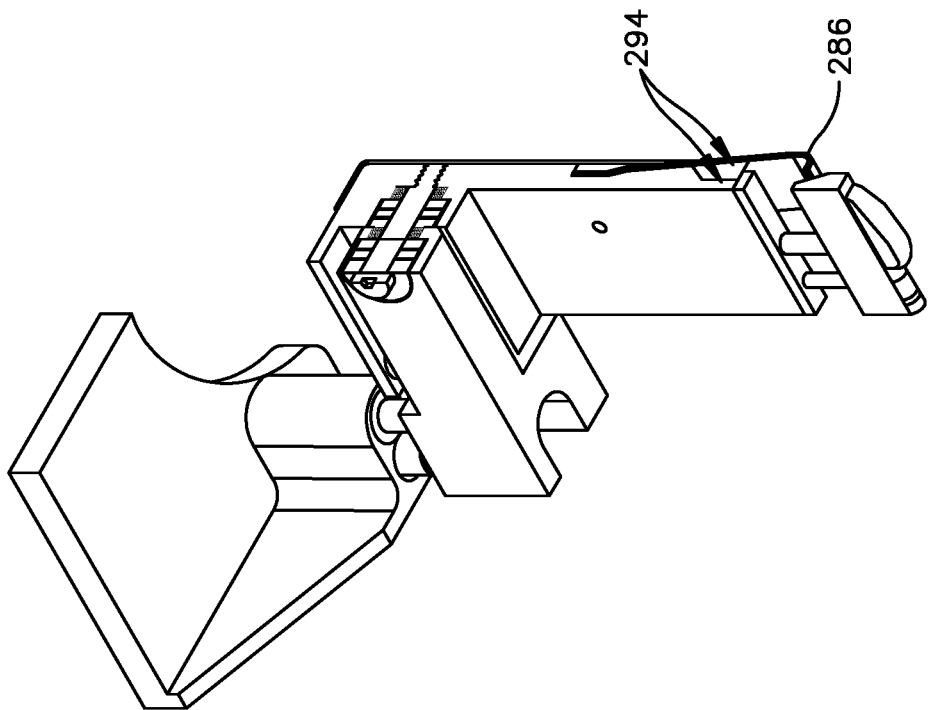
FIGS. 6A and 6B are perspective views of the finger assembly of FIG. 3 in a first state in which the bumper is extended and the talons are in a retracted position.
Figure 6A:
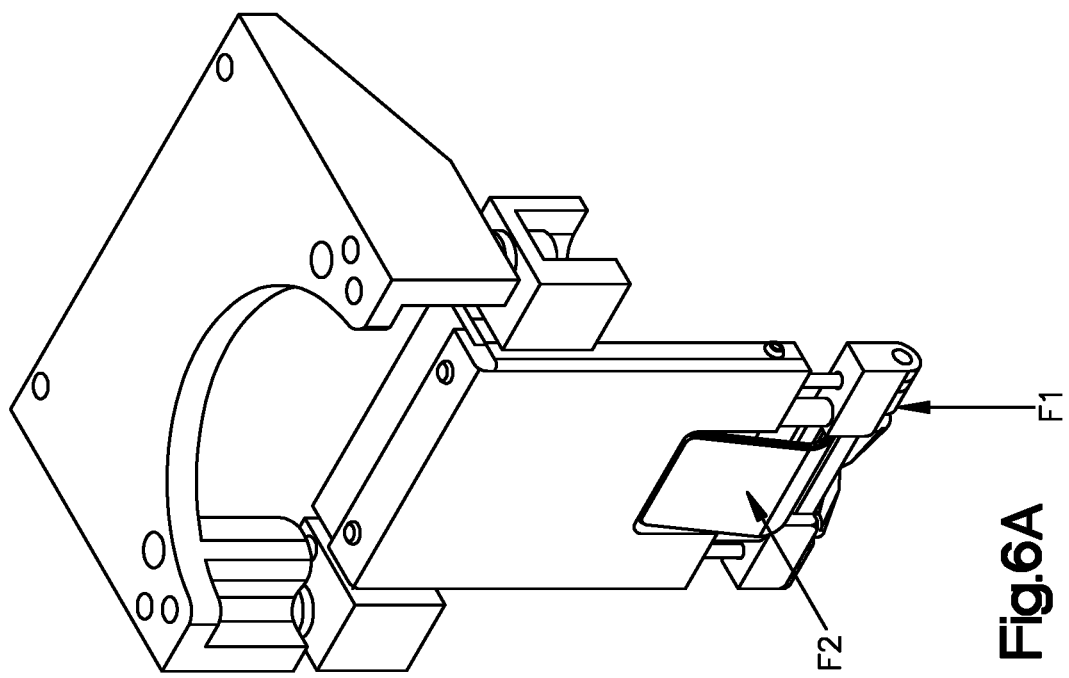

Turning now to the figures, FIGS. 1 and 2 illustrate an example of an automated robotic arm system 100 of the general type that may employ embodiments of the present invention for lifting or manipulating objects. System 100 includes a robotic manipulator 102 (a distal portion of which is illustrated), a first end effector 104, and a second end effector 106. In FIG. 1, the system 100 is illustrated in a first state that corresponds to the robotic arm 100 in a ready state. In FIG. 2, the system 100 is illustrated in a second state that corresponds to arm 100 having engaged and lifted an item 108.

Fingers of the system 100 are designated in the description of FIGS. 1 and 2 by reference number 116a and 116b. Embodiments of the fingers are provided herein as finger assemblies 216, 316, 416, and 516. Reference number 116 in this description is employed to generally refer to a finger of any one of the embodiments.

The robotic manipulator 102 may be any suitable material handling robot (e.g., Cartesian robot, cylindrical robot, spherical robot, articulated robot, parallel robot, SCARA robot, anthropomorphic robot, any other suitable robotic manipulator and/or robotic arm, automated guided vehicles including lift capabilities, vertical lift modules, gantries, overhead lift modules, and any other suitable material handling equipment that interacts with or otherwise handles objects) that is operable by a management device (e.g., a computing device or other electronic controller).

The robotic manipulator 102 may include any suitable type and number of sensors disposed throughout the robotic manipulator 102 (e.g., sensors in the base, in the arm, in joints in the arm, in an end effector, or in any other suitable location). The sensors can include sensors configured to detect pressure, force, weight, light, objects, slippage, and any other information that may be used to control and/or monitor the operation of the robotic manipulator 102, including the end effector 104 and, where employed, end effector 106. The sensors may include any suitable combination of sensors capable of detecting depth of objects, capturing RGB and other images of objects, scanning machine-readable information, capturing thermal images, detecting position and orientation of objects, and performing any other suitable sensing as described herein.

The management device may be configured to manage the operation of the robotic manipulator 102 (e.g., moving the robotic manipulator through different poses and orientations), the first end effector 104 (e.g., causing the first end effector 104 to grasp an item 108), and the second end effector 106 (e.g., causing the second end effector 106 to grasp the item 108). In some examples, the management device can be distributed at one or more locations. For example, a first management device may be local to the robotic manipulator 102 and include hardware and firmware and a second management device may be remote from the robotic manipulator 102 and include software. The management device may include any suitable combination of software, firmware, processors, memory modules, specialized chips, sensors, and the like to implement the techniques described herein. In some examples, the management device receives instructions over a network from a server to perform the techniques described herein.

The items 108 can be any object capable being manipulated by the item manipulation system 100. Depending on the system in which the item manipulation system 100 is implemented, the items 108 may represent a wide variety of different items having different characteristics. The items 108 may include, for example, personal electronic devices, computers, recreational equipment, food products, television sets, clothing, household supplies, automotive parts, appliances, books, and any other suitable object capable of being manipulated by the system 100. Object 108 may be contained in a box or other packaging, or in some cases, loose items.

The first end effector 104 includes a first arm 110a and a second arm 110b. The arms 110a and 110b are moveable towards each other and away from each other, as indicated by arrows 112 and 114. For example, the first end effector 104 can include one or more actuators or other suitable drive mechanisms to cause the movement illustrated by arrows 112 and 114. In some examples, the arms 110a and 110b can be moved independently of each other (e.g., the arm 110a can be moved while the second arm 110b remain fixed).

The first end effector 104 also includes a first finger 116a and a second finger 116b. The fingers 116a and 116b are moveable towards each other and away from each other, as indicated by arrows 112 and 114, by virtue of their connections to the arms 110a and 110b. Each finger 116a and 116b includes a finger body 118 and a talon, identified by reference number 120. Description of finger 116a and 116b, as well as alternative embodiments 216, 316, and 416, are provided below. It is understood that alternative finger embodiments 216, 316, and 416 may be employed and form part of robotic arm system 100. In this regard, FIGS. 1 and 2 employ reference numbers 116a and 116b for convenience of illustration. The optional second end effector 106 is disposed between the two arms 110a and 110b. The second end effector 106 is an example of a translating suction end effector. Thus, in operation, the second end effector 106 may translate in the directions of arrow 122 (e.g., away from and towards the item 108). The second end effector 106 includes a suction head 124 at a distal end. The suction head 124 is moveable into and out of engagement with the items 108.

FIG. 1 illustrates a first state of the item manipulation system 100. In this first state, the item manipulation system 100 is preparing to manipulate the item 108. In particular, the item manipulation system 100 is preparing to grasp the item 108 and remove the item 108 from a base surface 128. Thus, the arms 110a and 110b have been moved outwardly relative to the object 108. The robotic manipulator 102 has moved the first end effector 104 and the second end effector 106 into the orientation illustrated in FIG. 1.

The base surface 128 may be any suitable container, surface, item, or other suitable thing on which the items 108 may rest. For example, the surface 128 may include an item container from which the items 108 (e.g., similar items or different items) are picked from the item container by the robotic manipulator 102 using techniques described herein. In an additional example, the surface 128 may support a stack or pile of items 108 from which the items 108 (e.g., similar items or different items) are picked from the pile by the robotic manipulator 102 using techniques described herein.

FIG. 2 illustrates a second state of the item manipulation system 100. In this second state, the item manipulation system 100 has used the first end effector 104 and the second end effector 106 to grasp the item 108. In this regard, finger bodies 118a and 118b contact opposing side faces of item 108. As explained more fully below, optional anti-slip surfaces on finger bodies 118 enhance the gripping contact between fingers 116a and 116b and item 108. Moreover, according to aspects of the present invention, retractable talons extend from a lower portion of finger bodies 118 to contact the lower face or underside of object 108 to enhance the load carrying capability of system 100.

FIGS. 3 through 7B illustrate a first embodiment 216 of the finger assembly. Finger assembly 216 includes a body 218, a retractable talon 220, and an end-effector mount 230. It is understood that in the embodiment shown, a pair of opposing finger assemblies 216 may be employed. For convenience of illustration, only one finger assembly is described, as it is understood that the description applies to each one of the two or more finger assemblies that are preferred.

Body 218 preferably is a flat member having a maximum thickness of 0.25 inches to enable finger assembly 216 to enter into thin gaps, such as between adjacent books or other objects, or between an obstruction (such as a wall) and the object. End effector mount 230 includes a connection mechanism to end effectors 104, 106 such that manipulator 102 can position finger assembly 216 as desired and controlled.

End effector mount 230 also may include a vertical compliance mechanism and rotational compliance mechanism. The vertical compliance mechanism can be any resilient device, such as a spring or elastomer, to correct or accommodate vertical displacement or positional error upon the finger assembly engaging the base surface 128. The rotational compliance mechanism can be any resilient device, such as a spring or elastomer, to correct or accommodate angular displacement or positional error while the finger engages the base surface 128. The compliance mechanism(s), which are referred to as compliance mechanism 232 herein, will be understood by persons familiar with robotic manipulators having fingers, and can be beneficial, for example, to enable finger body 218 to align or orient itself or make contact across its width when in contact with base surface 128, such as where the position or orientation of end effector 104,106 and/or base surface 128 has a small error, to account for tolerances of all parts, and/or when movement of the robotic manipulator is rapid and/or imprecise.

Figure 19:
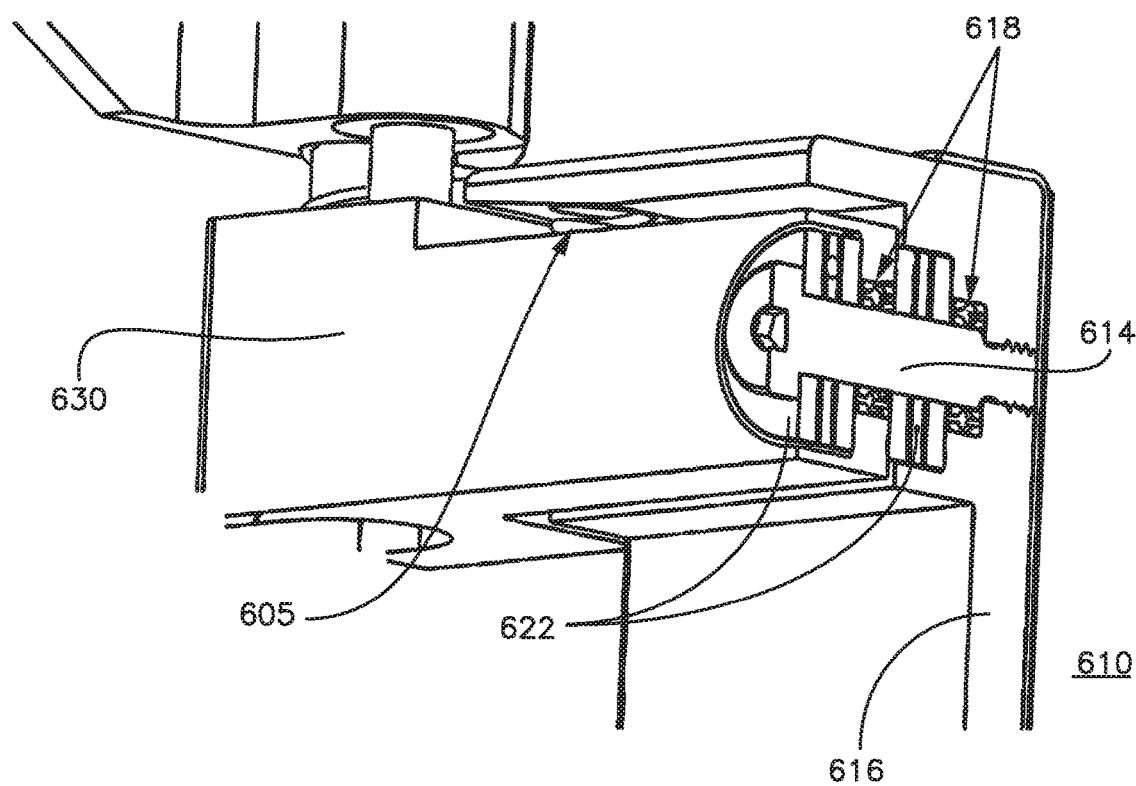
FIG. 19 is a perspective, partially cut away view of a rotational compliance mechanism.

FIG. 19 illustrates a particular embodiment of a horizontal compliance mechanism 610 that includes a shoulder bolt 614, a pair of bearings 618, and a pair or thrust bearings 622. Shoulder bolt 614 in the figure is illustrated as screwed into finger 616 and extending through a recess in a part of the end effector mount 630. Bearings 618 can be any type of bearing, such as without limitation roller bearings or ball bearings, that are mounted onto a shaft of shoulder bolt 614 in a conventional manner. Thrust bearings 622 preferably are conventional thrust bearings mounted on the shaft of the shoulder bolt 614 and enable bolt 614 to be torqued as desired while enhancing the freedom of rotation of bearings 618. A spring 605 mounted between finger 616 and end effector mount 630 returns finger 616 to an at-rest or home position and enables pivoting of finger 616 about bolt 614 when a lower portion of finger 616 (not shown in FIG. 19) contacts a base surface 128. A gap shown in FIG. 19 all around finger 616 permits rotational movement of finger 616 relative to mount 630 as needed.

Finger body 218 is coupled to mount 230. The term "couple" is used herein to refer to a mechanical connection and encompasses configurations in which coupled parts are not in direct contact and have intermediate structure between them. In the embodiment shown in the figures, finger body 218 extends downwardly from mount 230 and is elongate. Finger body 218 includes a contact face 234 for contacting a side face 132 of object 108. Face 234 preferably has an anti-slip surface, such as one having a high friction material (which is known in the art) applied to it, to aid in gripping the object between faces 234 of opposing finger bodies 218.

Figure 7B:
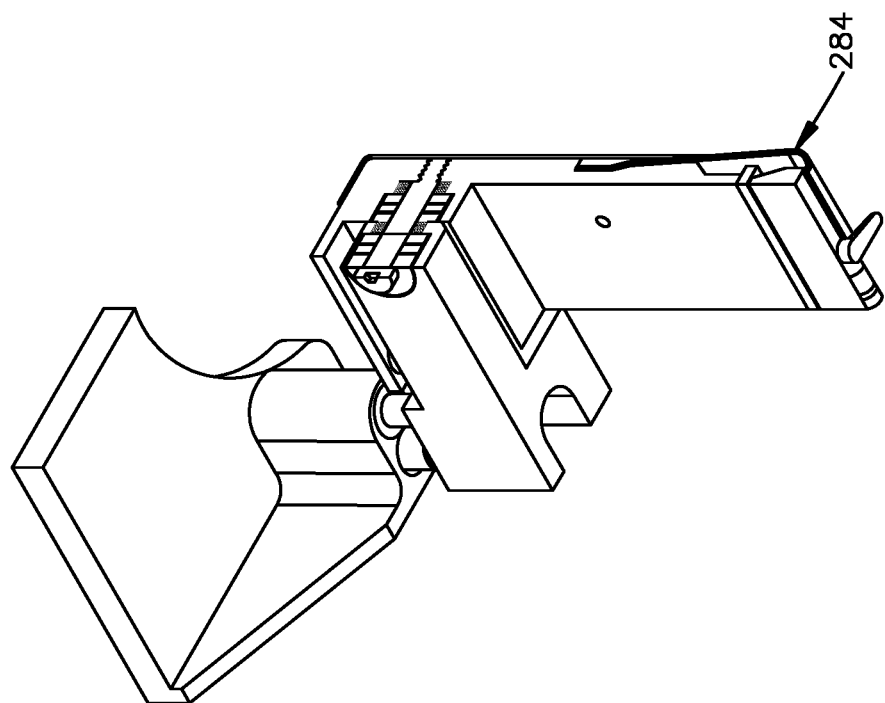
FIGS. 7A and 7B are perspective views of finger assembly of FIG. 3 in a second state in which the bumper is in a vertically upward, locked configuration and the talons are in an extended position.
Figure 7A:
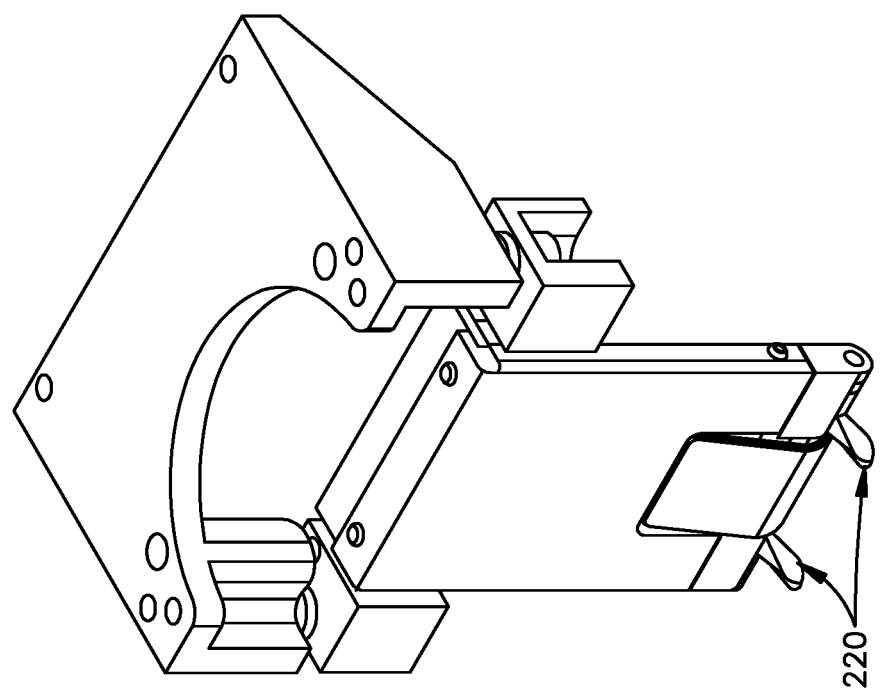

Finger body 218 also includes a barrel cam assembly 240 to actuate talon 220 between its retracted position (FIGS. 4, 6A, and 6B) and its extended position (FIGS. 3, 7A, 7B). Barrel cam assembly 240 is vertically oriented such that when the finger assembly 216 is oriented for lifting a box or like object 108, contact face 234 is vertical and/or talon 220 is horizontal. The terms "vertical" refers to the approximate general orientation of a barrel cam rotational axis 290 (FIG. 4), because the barrel cam body 244 in the figures is rigidly attached to talon 220, which is approximately parallel to base surface 128, which is presumed to be horizontal or approximately horizontal.

Barrel cam assembly 240 includes a barrel cam body 244 and a cam follower 242. Barrel cam 240 converts longitudinal or vertical motion from the action of the end effector 104,106 into rotational motion that actuates talon 220. Thus, cam body 244 includes at least one of a groove and a ridge that is configured for rotation about a barrel cam rotational axis in response to engagement with the cam follower. In the embodiment of the figures, the groove 246 is an S-shaped or spiral grove in the face of the body 244 and the cam follower is a pin 242 affixed within finger body 218 and capable of sliding in groove 246. Preferably, finger assembly 216 includes a pair of talons and barrel cams, as illustrated in the figures.

A bumper 260 translates relative to finger body 218 on rails 292 and is biased downwardly (or hung) toward its downward position by springs 266, as shown in FIG. 4. To actuate the barrel cam assembly 240, the end effector may move finger assembly 216 until its distal-most end at a lower surface of bumper 260 contacts base surface 128 against the biasing force. Barrel cam body 244 then moves upwardly with bumper 260 against the biasing of springs 266. Thus, bumper 260 is driven upwardly relative to finger body 218 (F1 in FIG. 6A), which translates barrel cam body 244 upwardly relative to pin 242, which is fixed to finger body 218. The relative movement of pin 242 in groove 246 caused by the translation of barrel cam body 244 creates rotational movement of barrel cam body 244.

Talon 220 includes an elongate talon body 250 and a rigid connection 252 to barrel cam body 244. Thus, rotation of the barrel cam body 244 about the barrel cam rotational axis 290 in a first direction moves the talon 220 to the extended position. And rotation of the barrel cam body 244 about the barrel rotational axis 290 in a second direction opposite to the first direction moves the talon 220 to the retracted position.

A lock mechanism 280 holds bumper 260 in its up position and enables talons 220 to be held in a position in which talon bodies 250 are located beneath object 108 to carry its load. Lock mechanism 280 includes a lock contact face 282 that biased to extend from the finger body face. Lock contact face is depressed against the bias when the locking face 282 and finger contact face 234 contact a face 134 of object 108 (F2 in FIG. 6A). Face 282 in the embodiment shown is a resilient member (such as formed by spring steel) having a lowermost bend or lip 286 that engages a recess 284 to hold bumper 260 in its up position while locking face 282 is depressed against object surface 134 by action of the robotic assembly end effector 104,106.

Figure 9A:
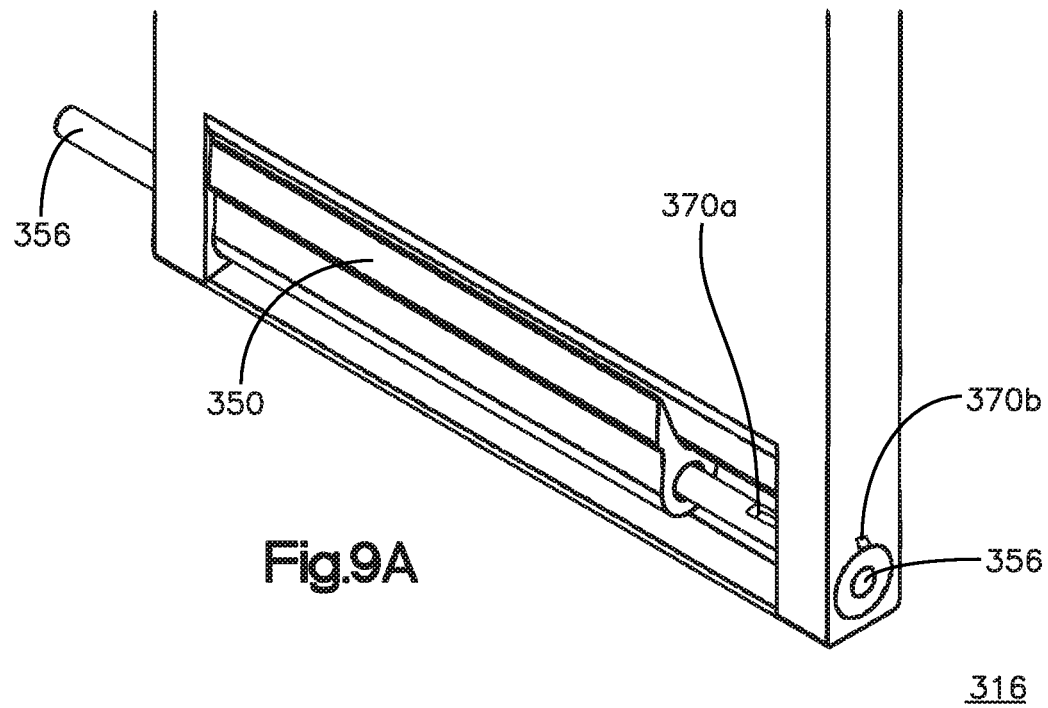
FIG. 9A is an enlarged perspective view of a portion of the finger assembly of FIG. 8.

When in the locked position, an optional detent 294 may hold locking face 282 in its locked position. In the embodiment shown, the detent mechanism are a pair of opposing magnets 294 that engage the metal sheet forming locking face 282. An example of the general type of magnetic detent mechanism that can be employed is illustrated in FIG. 9A. Upon release of the force of finger assembly 216 against object surface 134, the spring bias in locking contact face 282 moves locking face 282 outwardly relative to finger contact face 234 such that lip 286 disengages with recess 284 to enable bumper 260 to be free to move toward its biased, down position after bumper 260 disengages base surface 128. Optionally, the barrel cam assembly may include a detent mechanism for retaining the first or second positions.

Figure 8:
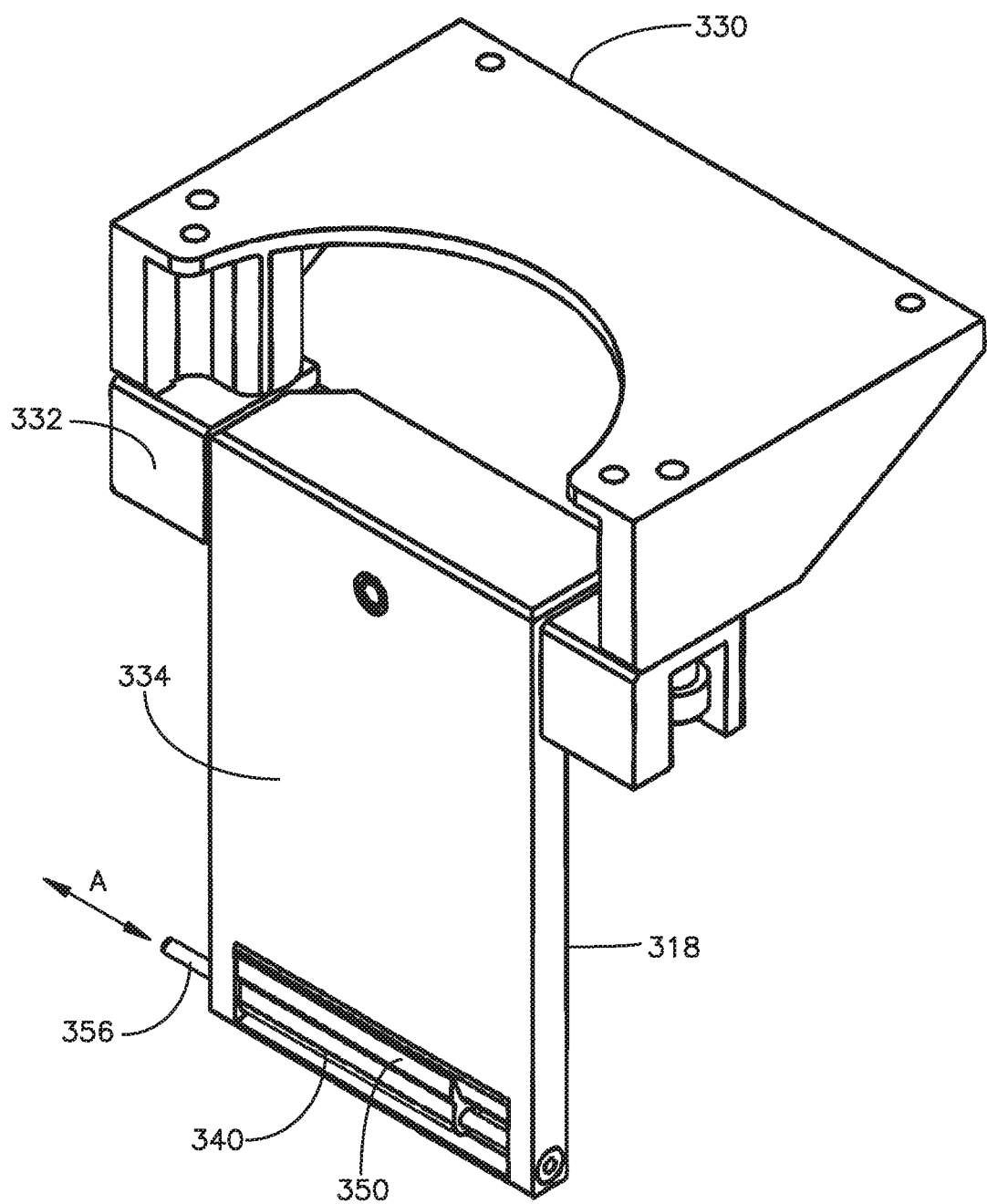
FIG. 8 is a perspective view of a second embodiment finger assembly illustrating the talon in a retracted position.
Figure 9B:
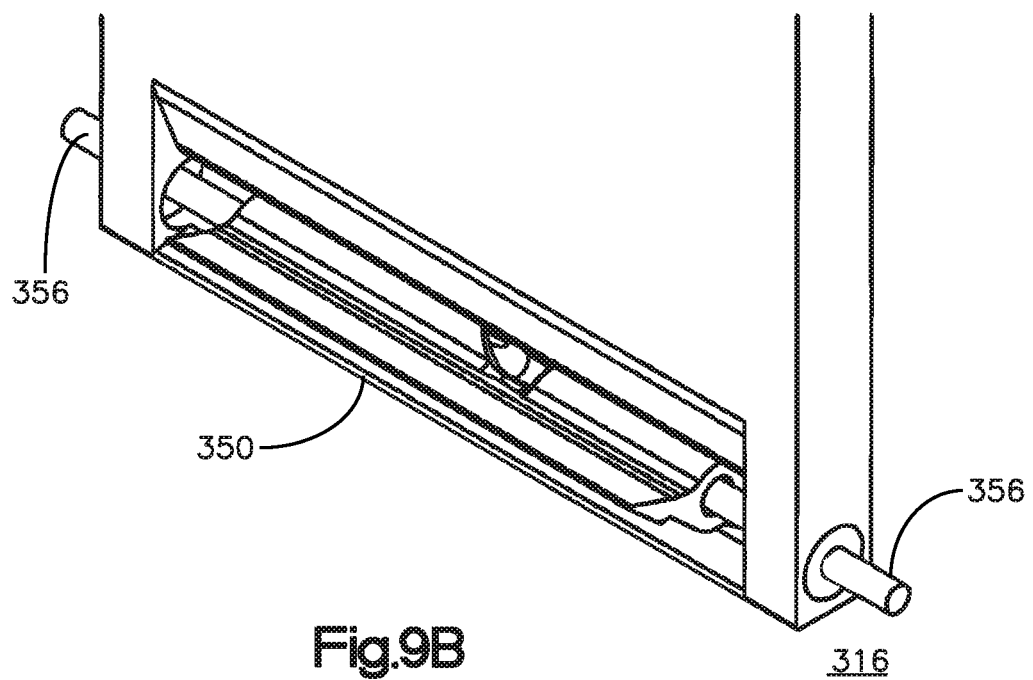
FIG. 9B is finger assembly of shown in FIG. 9A illustrating the talon partially moved to the extended position.
Figure 9C:
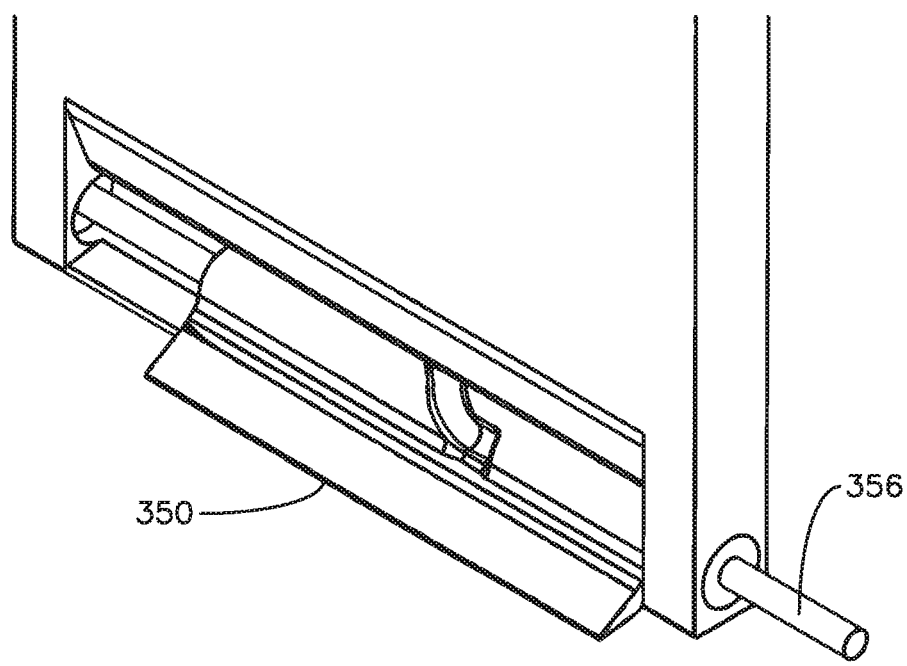
FIG. 9C is finger assembly of shown in FIG. 9A illustrating the talon in the extended position.
Figure 10:
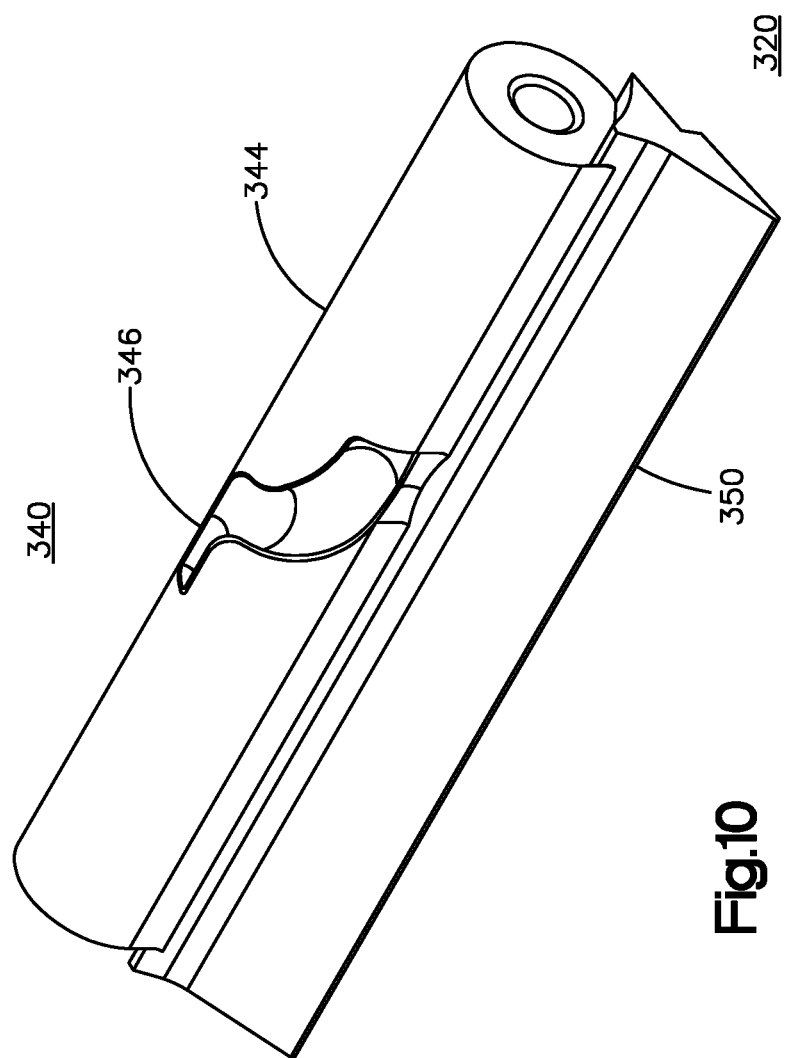
FIG. 10 is an enlarged perspective view of the barrel cam body and talon broken away from the view of FIG. 9A.
Figure 11:
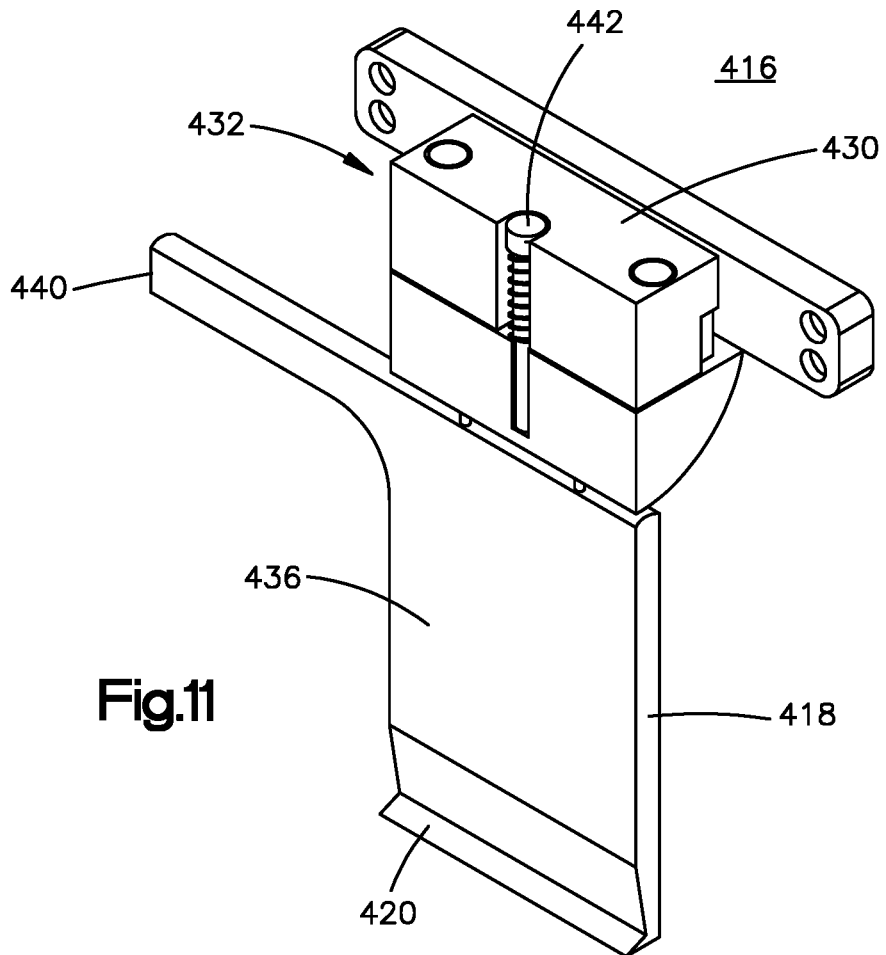
FIG. 11 is a perspective view of a third embodiment finger assembly.
Figure 12:
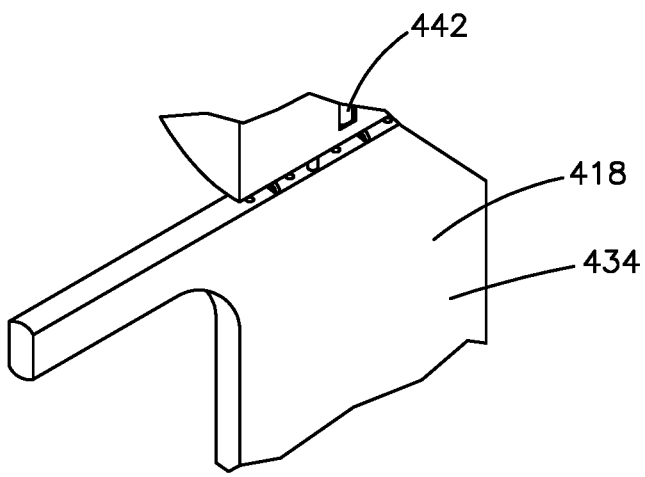
FIG. 12 is perspective, opposing view of a portion of the finger assembly of FIG. 11.
Figure 13:
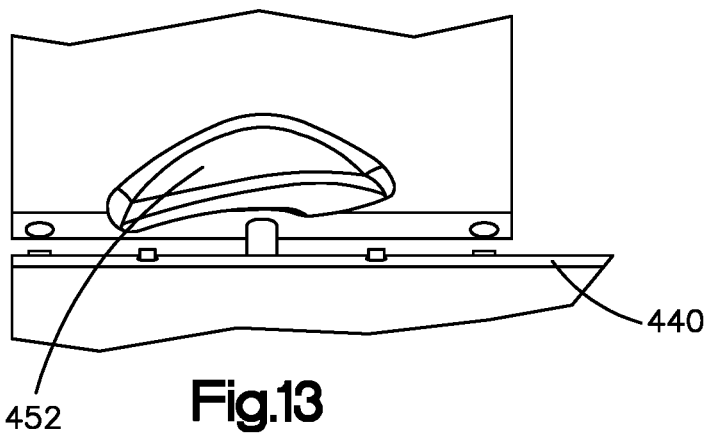
FIG. 13 is a side view of a portion of the finger assembly of FIG. 11.
Figure 14:
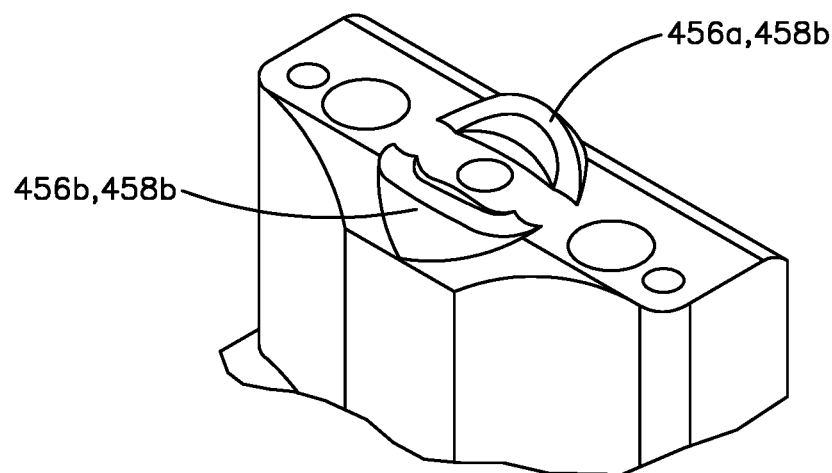
FIG. 14 is a perspective view of a portion of the finger assembly of FIG. 11.

FIGS. 8 through 10 illustrate another embodiment 316 of the finger assembly. Finger assembly 316 includes a body 318, a retractable talon 320, and an end-effector mount 330. As discussed above, it is understood that in the embodiment shown, a pair of opposing finger assemblies 316 may be employed. For convenience of illustration, only one finger assembly with be described, as it is understood that the description applies to each finger assembly.

Body 318 preferably is a flat member as described above. End effector mount 330 includes a connection mechanism to end effectors 104, 106 such that manipulator 102 can position finger assembly 216 as desired and controlled. End effector mount 330 also may include a vertical compliance mechanism and rotational compliance mechanism as described above for first embodiment finger assembly 216.

Finger body 318 is coupled to mount 330. In the embodiment shown in the figures, finger body 318 extends downwardly from mount 330 and is elongate. Finger body 318 includes a contact face 334 for contacting a side face 134 of object 108. Face 334 preferably has an anti-slip surface, such as one having a high friction material applied to it, to aid in gripping the object between faces 334 of opposing finger bodies 318.

Finger body 318 also includes a horizontally oriented barrel cam assembly 340 to actuate talon 320 between its retracted and its extended position. Barrel cam assembly 340 is horizontally oriented such that when the finger assembly 316 is oriented for lifting a box or like object 108 and contact face 324 is in its conventional vertical position, talon 220 is horizontal and in the position for lifting. The term "horizontal" refers to the approximate general orientation of a barrel cam rotational axis 390 (FIGS. 8 and 9A-9C), as finger assembly 316 engages object 108 as it is presumed that base surface 128 is approximately horizontal.

Barrel cam assembly 340 includes a barrel cam body 344, a cam follower 342, and a shaft 354. A talon body 350 is rigidly attached to barrel cam body 344 such that rotation of barrel cam body 344 and talon body 350 are in unison. Shaft 354 preferably extends through barrel cam body 344 and extends outwardly therefrom on one or more sides to form a shaft extension 356 (that is, shaft 354 and extension 356 are portions of the same unitary shaft). A cam follower, which in the embodiment shown is a pin 342, which preferably is affixed on finger body 318 and resides in an S-shaped or spiral groove 346 formed in barrel cam body 344.

Barrel cam 340 converts longitudinal or horizontal motion of shaft 354 into rotation motion of barrel cam body 244 and talon body 350. In this regard, end effector 104,106 can move finger 316 such that shaft extension 356 engages a datum surface (not shown in the figures). Datum surface can be any surface sufficient for shaft 354 to translate along its longitudinal axis (for example, as shown as arrow A in FIG. 8) in response to finger 316 being pushed against the datum surface. For non-limiting example, datum surface can be a vertical surface of a tote in cases in which base surface 128 is part of a tote, a vertical surface near the location of objects 108 specifically designed and registered to act as a datum for shaft 354, or any other vertical, horizontal, or inclined surface, as will be understood by persons familiar with robotic arm manipulation.

In operation, translation of shaft 354 translates barrel cam body 344 in a first direction, which drives a groove 346 relative to stationary pin 342 to impart rotary motion to barrel cam body 344. In the embodiment shown, talon body 350 is affixed to body 344 and thus rotates in the prescribed direction. Referring to FIGS. 9A through 9C, shaft extension 356 is moved from its leftmost position (as oriented in the figures), which corresponds to the talon retracted position, longitudinally along a direction A, rightward such that groove 346 rides over fixed pin 342 to rotate the barrel and cam combination through an intermediate position shown in FIG. 9B to the extended position shown in FIG. 9C.

Shaft 354 may also be translated in a second direction, opposite the first direction, and thus talon 320 can be moved from an extended position laterally outwardly from the finger body and the retracted position in which the talon body is rotated so as to be recessed or flush with finger body face 334. In this regard, when talon body 350 is in its retracted position, finger body face 334 can engage surface 134 of object 108 in a conventional manner. Clearance on each side of barrel cam body 344 provides a capability for longitudinal movement.

FIG. 9A illustrates a detent mechanism for retaining the talon in the retracted position. The detent mechanism illustrated includes a magnet 370a on shaft 354 at a point on its circumference, illustrated at the 12 o'clock position, and a corresponding magnet 370b on a sleeve or bearing in which the shaft 354 rotates. The magnets are positioned such that they align when the talon is in the retracted position to retain the talon in the retracted position during operation of the system 100, as desired. Another magnet (not shown in the figures) can be employed on the shaft at the 3 o'clock position of the shaft to retain the talon in the extended position. Or the sleeve or bearing may have another magnet (not shown) at the 9 o'clock position (as oriented in FIG. 9A) to retain the talon in the extended position. In most circumstances, the retaining force applied by the detent mechanism will be small compared with the force applied via the barrel cam so as not to interfere with the barrel cam actuation between the extended and retracted positions. The present invention is not limited embodiments having a detent mechanism, nor to any particular structure of the detent mechanism where existing.

FIGS. 11 through 15 illustrate a third embodiment 416 of the finger assemblies, which is referred to as a spin paddle configuration. Finger assembly 416 includes a body 418, a retractable talon 420, and an end-effector mount 430. It is understood that in the embodiment shown, a pair of opposing finger assemblies 416 may be employed. For convenience of illustration, only one finger assembly with be described, as it is understood that the description applies to each finger assembly.

Body 418 preferably is a flat member having a maximum thickness of 0.25 inches, as described above. End effector mount 430 includes a connection mechanism to end effectors 104, 106 such that manipulator 102 can position finger assembly 416 as desired and controlled. End effector mount 430 also may include vertical compliance mechanisms and rotational compliance mechanisms, as disclosed elsewhere herein.

In the embodiment shown in the figures, finger body 418 extends downwardly from mount 430 and is elongate. Finger body 418 is rotationally coupled to mount 430 such that each side of finger body 418 is configured for engaging a surface 134 of object 108. Finger body 418 includes a first, anti-slip or high friction contact face 434 and a second face 436 on an opposite of finger body 418 from first face 434. Second face 436 may also have an anti-slip or high friction surface.

A contact member, such as a paddle 440 extends outwardly from between faces 434 and 436. The contact member may be any structure suitable for rotating body 418, including a portion of body 418. A talon 420 extends outwardly from second face 436.

A spin mechanism 450 is configured to enable finger body 418 to spin on a shaft 438 that connects finger body 418 to end effector mount 430 in response to a moment applied to paddle 440. A spring 442 biases finger body 418 upwardly. Spin mechanism includes a cam 452 and a cam follower 454 that bias finger body 418 to either its first operative position in which first face 434 is in position to contact object 108 or second operative position in which second face 436 is in position to contact object 108. For a non-limiting example, cam 452 biases finger body 418 away from intermediate positions between the first and second operative positions in which finger body may be oblique or perpendicular to surface 134 of object 108 or oblique or perpendicular to a desired orientation relative to end effector 104,106.

Cam 452 preferably is formed by a pair of cam elements 456a and 456b, which preferably are located on an underside of mount 430 and on opposing sides of mount 430. Element 456a includes a cam surface 458a. Element 456b includes a cam surface 458b. Surfaces 458a and 458b may have any shape that performs the biasing function, and preferably are eccentric surfaces to aid in the movement of finger body 418 to its desired first or second operative position.

Figure 15:
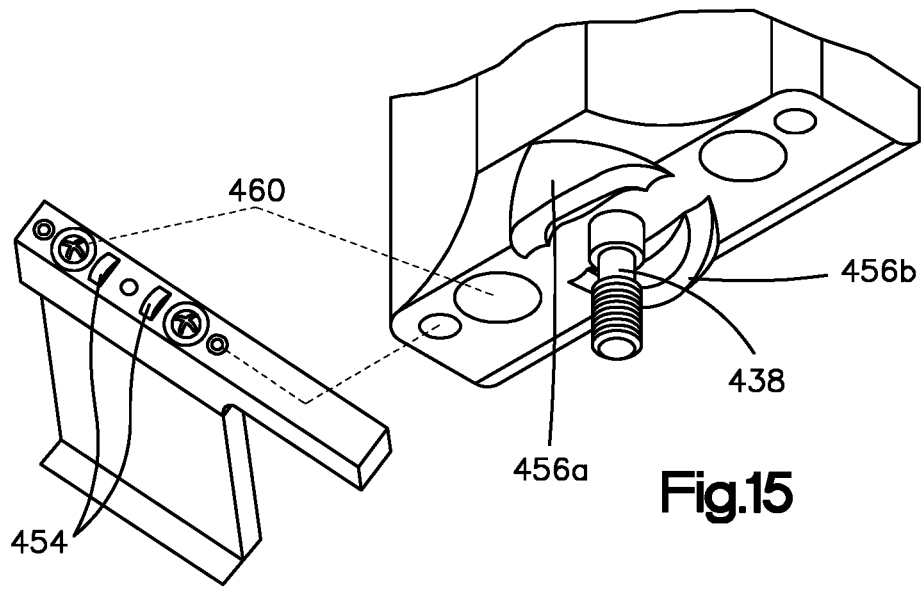
FIG. 15 is another perspective view of a portion of the finger assembly of FIG. 11.

Cam follower 454 preferably include rollers (FIG. 15) on an upper ridge of body 418 that contact or ride on surfaces 458a and 458b during rotation of body 418. Cam elements 456a and 456b preferably are spaced apart such that body 418 is at a rest state between 456a and 456b. Optionally, a detent 460 may hold body 418 in position. For non-limiting example, spring loaded balls on body 418 can register into corresponding recesses on mount 430 (FIG. 15). Magnets or other detent mechanisms may be used.

In operation, end effector may move finger 416 into position according to the desired mode of lifting. If only high friction contact is desired, end effector 104,106 may position or confirm position of finger assembly 416 in its first operative state such that the first face 434 of the finger body is adapted to contact a side face 134 of an object to be lifted. Alternatively, if it is desired that the talon 420 lift the object or the talon 420 and second face 436 lift the object, end effector 104,106 may position or confirm position of finger assembly 416 in its second operative state such that talon 420 lifts or contributes to the lift. In this regard, if the control system determines that the finger assembly 416 is not in the desired position, the manipulator 102 can move finger assembly 416 to impart a moment to the finger body 418 by moving body 418 such that paddle 440 is put into contact with a datum surface. The moment about shaft 438 causes body 418 to pivot relative to mount 430 such that cam surfaces 458a,b initially impeded rotation of body 418 and then, when past mid-point, enhances the rotation until cam followers 454 are located in an at-rest position between elements 456a and 456b.

Figure 16:
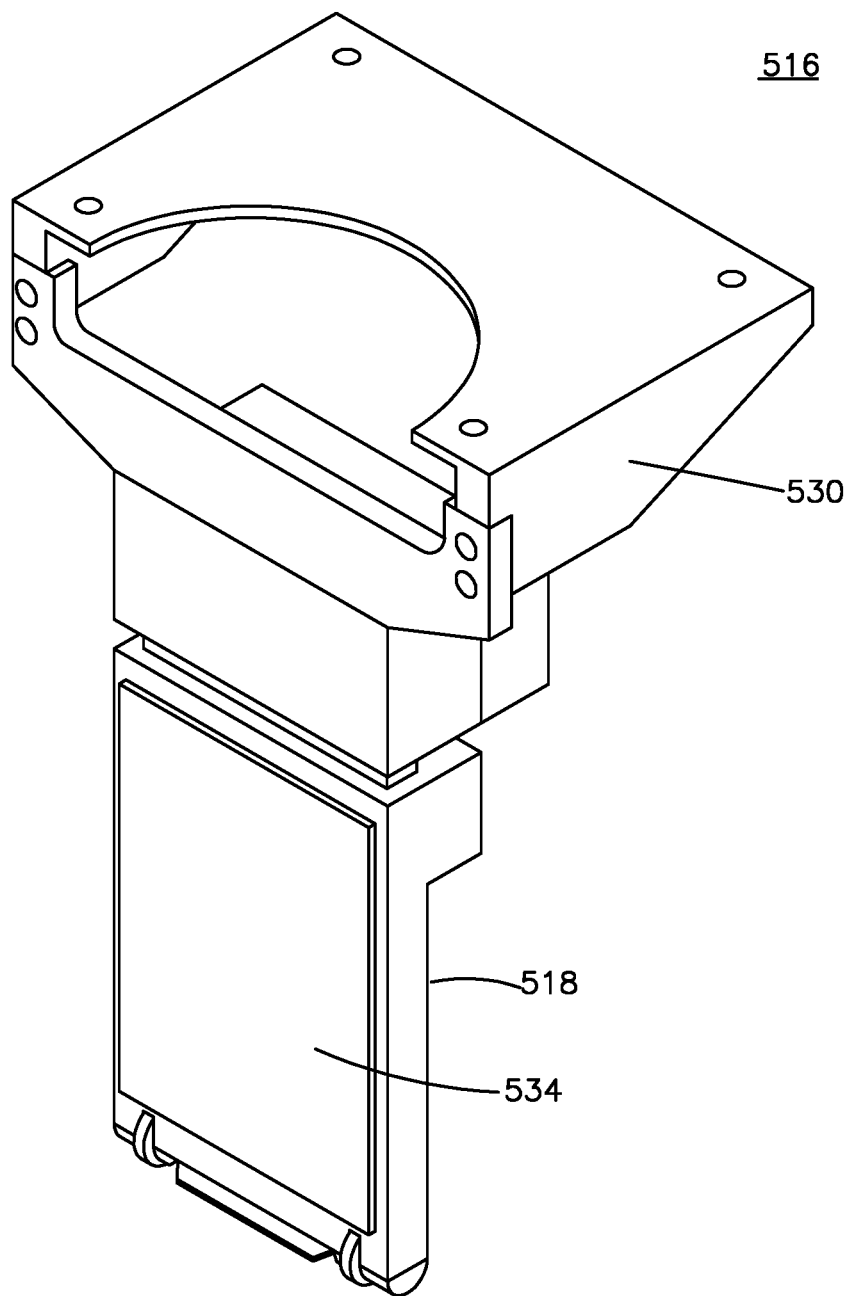
FIG. 16 is a perspective view of a fourth embodiment finger assembly.
Figure 18:
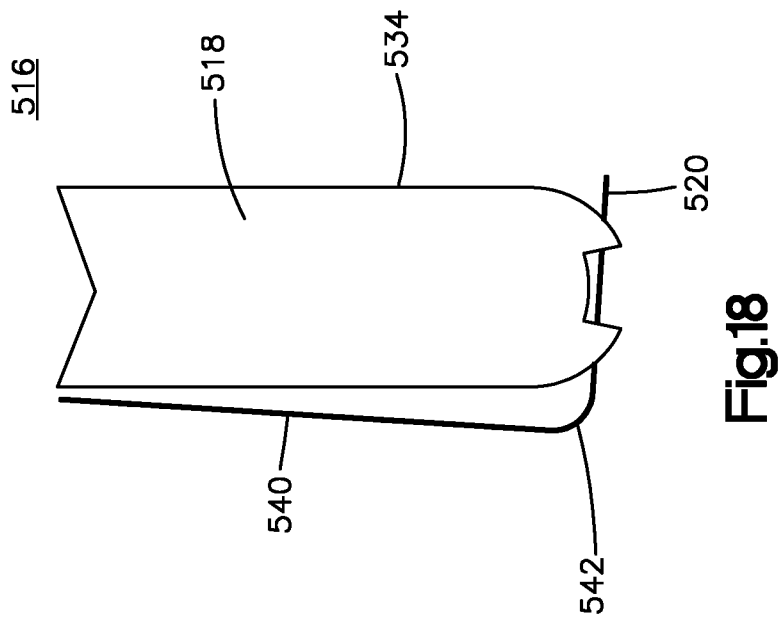
FIG. 18 is a side view of the finger assembly of FIG. 16 with the talon shown in a retracted or partially retracted position.
Figure 17:
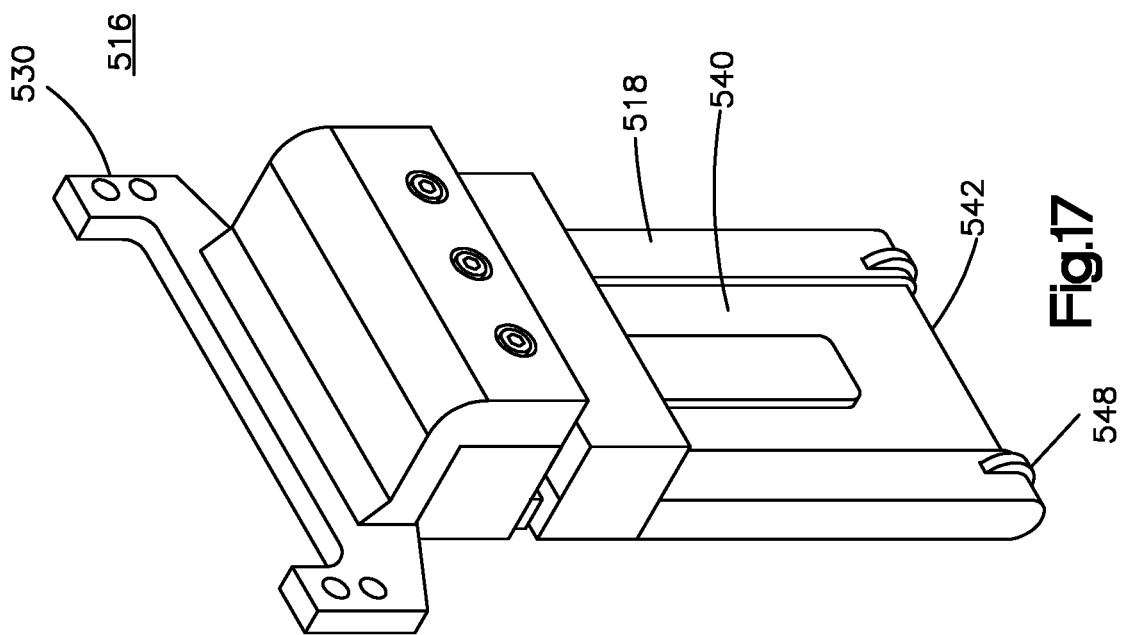
FIG. 17 is another perspective view of the finger assembly of FIG. 16.

FIGS. 16 through 18 illustrate another embodiment 516 of the finger assembly. Finger assembly 516 includes a body 518, a retractable talon 520, and an end-effector mount 530. It is understood that in the embodiment shown, a pair of opposing finger assemblies 516 may be employed. For convenience of illustration, only one finger assembly is described herein, as it is understood that the description applies to each finger assembly.

Body 518 preferably is a flat member having a maximum thickness of 0.25 inches, as described above. End effector mount 530 includes a connection mechanism to end effectors 104, 106 such that manipulator 102 can position finger assembly 516 as desired and controlled. End effector mount 530 also may include vertical compliance mechanisms and rotational compliance mechanisms, as disclosed elsewhere herein.

In the embodiment shown in the figures, finger body 518 extends downwardly from mount 530 and is elongate. Finger body 518 includes a first, anti-slip or high friction contact face 534. Talon 520 as illustrated is a thin plate material that is biased outward so as to extend from face 534 and to be in position to slide or be positioned beneath object 108 for lifting.

Talon 520 preferably is formed on the distal end of a backing plate 540 that is located on the opposing side of finger body 518 from contact face 534. Plate 540 is connected to talon 520 by a bend 542 and may be integrally formed with talon 520. Plate 540 preferably is formed of a resilient material, such as (as a non-limiting example) spring steel, and attached to finger body a location spaced apart from bend 542. Plate 540 is configured such that it is biased to be vertical or lie flat against the backside of body 518.

Talon 520 can retract when, for a non-limiting example, a horizontal normal force (that is, a retraction force) is applied to talon 520 at its tip, such as when end effector 104,106 moves finger assembly 516 to engage an object 108 such that talon 520 is spaced apart from base surface 128 and talon 520 contacts object surface 134. The retraction force may be greater than the spring biasing force, and talon 520 will move rearward until finger body surface 534 contacts object surface 134. The retracted or partially retracted position of talon 520 is illustrated in FIG. 18.

In operation, end effector 104,106 may move finger 516 into position according to the desired mode of lifting. If only high friction contact by body surface 534 (without talon lifting) is desired, end effector 104,106 may position or confirm position of finger assembly 516 such that talon 520 contacts surface 134 of object 108 or the like, thereby retracting causing talon 520 to retract against the spring biasing force. Manipulator 102 may then lift object 108 in a conventional manner. If it is desired for talon 520 to lift at least part of the load of object 108, end effector 104,106 may position finger assembly 516 such that talon 520 engages or slides beneath object 108 such that talon 520 lifts or contributes to the lift. Talon 520 may slide on surface 128 or may be positioned just above surface 128. Use of rollers (illustrated in FIG. 17 by reference number 548), slide plates, and the like (preferably outboard of talon 520) may also be employed. Surface 534 may also engage surface 134 to contribute to lifting object 108 while talon 520 is in its lift position.

Some, any, or all of the methods and operations may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, instructing the end effector to grasp the item generally includes instructing the first end effector to grasp the item such that the pair of opposing elongate fingers of the first end effector contact opposing side surfaces of the object 108, and/or may include instructing the first end effector to grasp the item such that the talons 120 extend underneath bottom edges of object 108.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The robotic arm technology disclosed herein may be employed with computer learning algorithms or artificial intelligence that enhances the control of the fingers and associated structure and function. In this regard, a control system may interpolate from existing information about and experiences with successful and unsuccessful prior sequences of seeing, engaging, and lifting an object according to established principles for computer learning. Further, the inventors contemplate a control system may extrapolate from the information and experiences to establish new sequences and functions for the robotic arm.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Preferred examples of this disclosure are described herein. Variations of those preferred examples may become apparent to those of ordinary skill in the art upon reading the foregoing description. The inventors expect skilled artisans to employ such variations as appropriate and the inventors intend for the disclosure to be practiced otherwise than as specifically described herein. Any practical combination of the structure and function of the elements of any embodiment may be combined into other disclosed embodiments, as will be understood by persons familiar with robotic technology. The disclosure is illustrative and is not intended to be limiting. Rather the present invention is intended to be defined by the claims.

What is claimed is:

1. A finger assembly for use at an end of a robotic arm, the finger assembly comprising:
   an end effector mount adapted for mounting to the robotic arm;
   a pivotable paddle coupled to and extending downwardly from the end effector mount, the paddle having a first anti-slip contact face and a second anti-slip contact face; and
   a fixed talon coupled at a lowermost point of the paddle and extending outwardly relative to the first anti-slip contact face, the paddle has a first rotational orientation in in which the paddle is configured to engage an object to be lifted by both the talon and the first anti-slip contact face and a second rotational orientation that is 180 degrees from the first rotational orientation, in which the paddle is configured to engage the object with only the second contact face.

2. A finger assembly for use at the end of a robotic arm, the finger assembly comprising:
   an end effector mount adapted for mounting to the robotic arm;
   a finger body rotationally coupled to the end effector mount, the finger body having first, anti-slip contact face and a second face opposite the first face, and a contact member located between the first face and the second face;
   a talon coupled to the finger body and extending from a lower portion of second face of the finger body; the talon is adapted to at least partially support a load from an item lifted by the robotic arm; and
   a spin mechanism including a cam located on one of the finger body and the end effector mount and a cam follower located on the other one of the finger body and the end effector, the cam and cam follower biasing the finger body toward either one of a first operative state relative to the end effector mount and a second operative state relative to the end effector mount and away from intermediate states between the first and second operative states; whereby the finger body is capable of being positioned in either one of the first operative state and the second operative state;

whereby (i) in the first operative state the first face of the finger body is adapted to contact a side face of an object to be lifted such that first face anti-slip surface engages the object, and (ii) in the second operative state the second face of the finger body is adapted to adapted to contact the side face of an object to be lifted such that second face anti-slip surface engages the object and in the second operative state the talon is adapted to extend beneath the object to at least partially support the object during lifting;

whereby a moment applied to the finger body rotates the finger body against the biasing of the spin mechanism to enable selection of first operative state and the second operative state.

3. The finger assembly of claim 2 further comprising a paddle extending laterally outwardly relative to the finger body, the paddle being rigidly attached to the finger body such that the moment is applied to the finger body by a force applied to the paddle.

4. The finger assembly of claim 3 wherein the cam is a pair of ramp surfaces on an underside of the end effector mount.

5. The finger assembly of claim 4 wherein the cam the ramp surfaces are eccentric.

6. The finger assembly of claim 4 wherein the talon is rigid and wherein a first one of the pair of ramp surfaces is spaced apart from the second one of the pair of ramp surface to form a gap therebetween, the gap being adapted for retaining an upper wall of the finger body therebetween.

7. The finger assembly of claim 4 wherein the cam follower includes rollers an upper portion of the finger body that engages the cam.

8. The finger assembly of claim 4 further comprising a detent for inhibiting movement of the finger body while the finger body is either the first operative state or the second operative state.

9. The finger assembly of claim 4 wherein the detent includes one of a spring loaded ball and an opposing recess and a pair of corresponding magnets.

10. The finger assembly of claim 4 wherein the talon is rigid.

11. The finger assembly of claim 4 wherein finger the body is the end effector mount includes vertical compliance means and rotational compliance means.

12. The finger assembly of claim 4 wherein finger body is rotationally coupled to the end effector mount by a central shaft, and the finger assembly includes a spring that biases the finger body upwardly against the cam.

13. The finger assembly of claim 4 further comprising a rotational compliance mechanism that includes a shoulder bolt connected between the finger body and the end effector mount, a pair of bearings mounted on a shaft of the shoulder bolt, a pair of thrust bearings mounted on the shaft of the shoulder bolt, and a spring biasing the finger body to an at-rest state.

* * * * *